United States Patent
Wing (10) Patent No.: US 6,650,440 B1
(45) Date of Patent: Nov. 18, 2003

(54) SYSTEM, APPARATUS AND METHOD FOR REDUCING FAX TRANSMISSION STATUS OUTCALLS FROM A FAX-TO-SMTP GATEWAY

(75) Inventor: Daniel George Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/277,318

(22) Filed: Mar. 26, 1999

(51) Int. Cl.$^7$ ................................................. H04N 1/00
(52) U.S. Cl. ..................... 358/402; 358/403; 358/407; 358/1.15; 379/100.01; 379/100.06
(58) Field of Search .................. 358/1.15, 1.9, 358/402, 403, 407, 434, 435, 436, 438, 439, 442, 468; 709/206, 203, 238; 379/100.01, 100.06, 100.09

(56) References Cited

U.S. PATENT DOCUMENTS

| | | | |
|---|---|---|---|
| 4,918,722 A | 4/1990 | Duehren et al. | ............ 379/100 |
| 5,291,546 A | 3/1994 | Giler et al. | .................. 379/100 |

(List continued on next page.)

FOREIGN PATENT DOCUMENTS

| | | | | |
|---|---|---|---|---|
| WO | WO-97/10668 A1 | * | 3/1997 | ............ H04N/1/00 |
| WO | WO 97/18665 | | 5/1997 | ............ H04N/1/32 |

OTHER PUBLICATIONS

Fajman, R., "An Extensible Message Format for Message Disposition Notifications", RFC 2298, found on www.cis.ohio-state.edu/cgi-bin/rfc/rfc2298, Mar. 1998, pp. 1–23.*

(List continued on next page.)

*Primary Examiner*—Edward Coles
*Assistant Examiner*—Joseph R. Pokrzywa
(74) *Attorney, Agent, or Firm*—Law Offices of Imam (57) ABSTRACT

A communication system for transmission of facsimile (fax) information using an email message from a sending fax device used by a sending fax user to a receiving fax device used by a receiving fix user through at least one mailer device including a sending gateway device coupled to the sending fax device for causing transfer of a fax message received from the fax device. The sending gateway device further attaches the transferred fax message to an email message. At least one of the mailer device is coupled to a receiving gateway device and is further coupled to the sending gateway device for receiving the email message and transferring the same to the receiving gateway device. The receiving gateway device is coupled to the receiving fax device for detaching the fax information from the transferred email message and coupling the detached fax information, through a receiving communication link, to the receiving fax device for use by the receiving fax user. The sending gateway device receives a particular fax message and, prepares an email message having attached thereto the particular fax message and transmits the prepared email message along with a first and a second confirmation requests to the receiving gateway device through the mailer device. The first confirmation request corresponds to a first response and the second confirmation request corresponding to a second response. Upon receipt of a first response to the first confirmation request, the sending gateway device awaits a predetermined length of time for a response to the second confirmation request and upon receipt of a response to the second confirmation request the sending gateway device places an outcall to the sending, fax device. In accordance with the teachings of the present invention, multiple outcalls for confirming the status of the fax message transmission is avoided thereby reducing costs to the sending fax user and further reducing the likelihood of confusion and logistic problems to the sending fax user.

17 Claims, 4 Drawing Sheets

U.S. PATENT DOCUMENTS

| | | | |
|---|---|---|---|
| 5,369,686 A | | 11/1994 | Dutra et al. .................. 379/94 |
| 5,488,651 A | | 1/1996 | Giler et al. ................. 379/100 |
| 5,712,907 A | | 1/1998 | Wegner et al. .............. 379/112 |
| 5,767,985 A | | 6/1998 | Yamamoto et al. ......... 358/402 |
| 5,805,298 A | | 9/1998 | Ho et al. ..................... 358/402 |
| 5,812,278 A | | 9/1998 | Toyoda et al. .............. 358/402 |
| 5,826,034 A | * | 10/1998 | Albal .......................... 709/239 |
| 5,838,683 A | | 11/1998 | Corley et al. ............... 370/408 |
| 5,872,845 A | * | 2/1999 | Feder ......................... 358/442 |
| 6,005,677 A | * | 12/1999 | Suzuki ....................... 358/442 |
| 6,163,809 A | * | 12/2000 | Buckley ..................... 709/237 |
| 6,374,291 B1 | * | 4/2002 | Ishibashi et al. ............ 709/206 |
| 6,437,873 B1 | * | 8/2002 | Maeda ....................... 358/1.15 |

OTHER PUBLICATIONS

Moore, K., "SMTP Service Extension for Delivery Status Notifications", RFC 1891, found on www.cis.ohio–stae.edu/cgi–bin/rfc/rfc1891, Jan. 1996, pp. 1–28.*

* cited by examiner

SYSTEM, APPARATUS AND METHOD FOR REDUCING FAX TRANSMISSION STATUS OUTCALLS FROM A FAX-TO-SMTP GATEWAY

FIELD OF THE INVENTION

This invention relates generally to the field of data transmission systems, and in particular, to a system, apparatus and method for reducing facsimile (fax) transmission status outcalls by a receiving Fax-to-SMTP gateway to a remote fax device upon the gateway receiving responses to at least two confirmation request messages.

BACKGROUND OF THE INVENTION

The transmission of facsimiles is a very popular mechanism for the transfer of information. It has been a standard of transferring information for many years. Fax transmissions are often used for sending textual documents, drawings, illustrations, music sheets, and other information fixed on a piece of paper or stored in memory as an electronic file. More recently, electronic mail (e-mail) has become another popular mechanism for the transfer of information. Because the use of e-mail has become widely prevalent recently, more information has been transferred between network equipment through the use of e-mail. For example, word processing application files are now readily transferred between email users, as are Internet web files in the form of Hyper Text Markup Language 'HTML'.

Recently, there has been a need to merge facsimile and e-mail transmissions. For instance, fax information can now be transmitted as an attachment to an e-mail message to other equipment that accepts reception of faxes. A personal computer (PC) can be set up to send an email message having attached thereto a facsimile file, which may be transmitted through the Internet to another PC having fax and modem capability or, alternatively, to another fax machine. One standard protocol employed in the industry for the transmission of a facsimile file with e-mail is to format the facsimile file in accordance with the Tagged Image File Format (TIFF).

Figure 1:
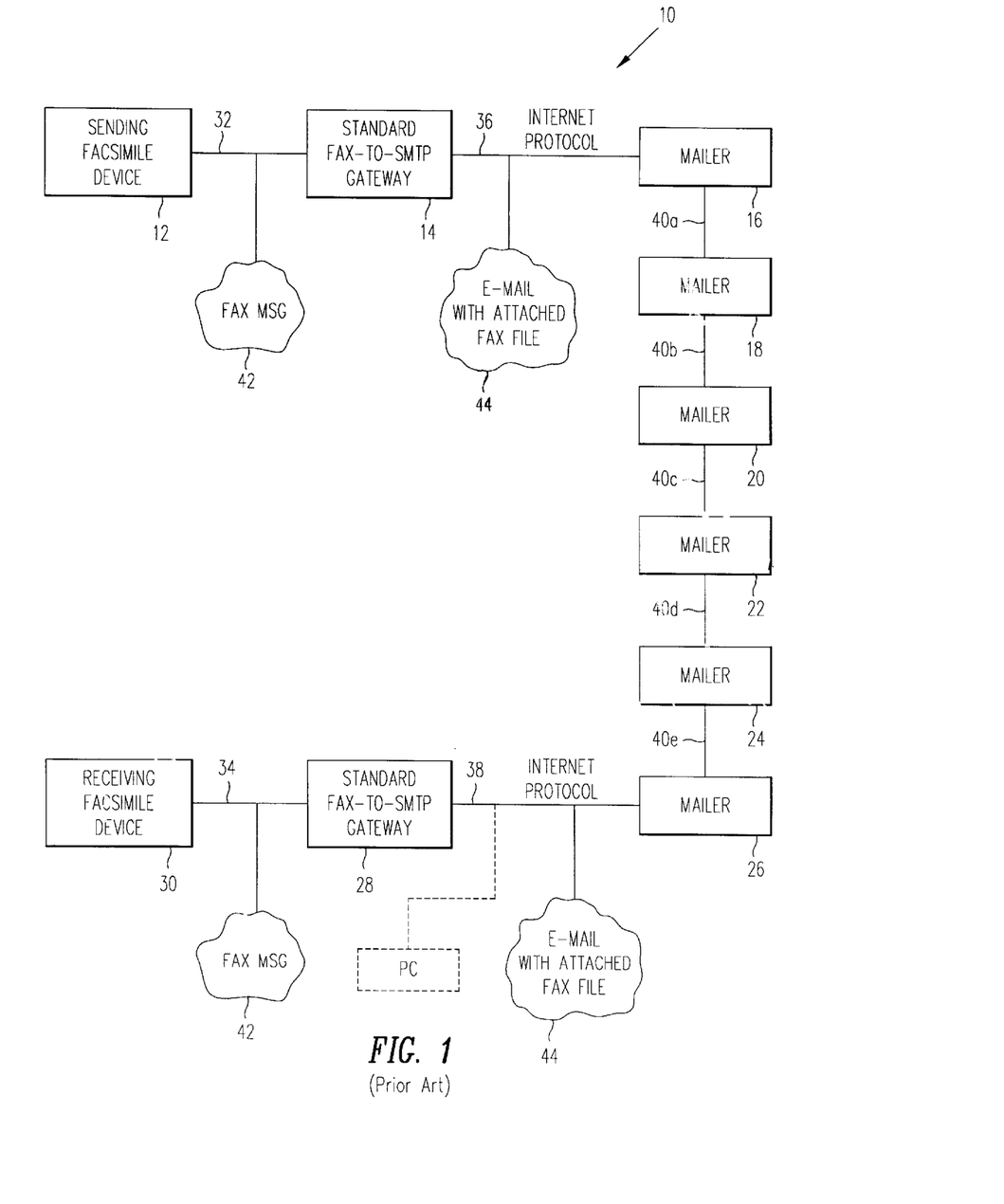
FIG. 1 illustrates a block diagram of a prior art fax-over-email communication system for transmitting facsimile data over an electronic mail (e-mail) communication network.

FIG. 1 illustrates a block diagram of an example prior art fax-over-email communication system 10 for the generation and transmission of email with an attached TIFF file. The system comprises a sending fax machine 12 and a standard FAX-to-SMTP gateway 14 (SMTP stands for "Simple Mail Transfer Protocol") at a sending end of the system 10. The fax-over-email communication system 10 also includes a plurality of mail servers (also known as SMTP servers or Mail Transfer Agents (mailers)), six of which are shown in FIG. 1 by example as mailers having respective even reference numbers 16–26 associated therewith. The system 10 further includes a FAX-to-SMTP gateway 28 and a fax machine 30 at a receiving end thereof. The sending and receiving fax machines 12 and 30 are coupled to respective FAX-to-SMTP gateways 14 and 28 by public switch telephone network (PSTN) interfaces 32 and 34. The FAX-to-SMTP gateways 14 and 28 are coupled respectively to mailer 16 and mailer 26 by respective communication links 36 and 38. The communication links 36 and 38 cause coupling between the gateways and the mailers pursuant to any protocol that enable ingress and egress mailers to communicate to SMTP gateways. An example of such a protocol is the Transmission Control Protocol/Internet Protocol (TCP/IP). Also, the mailers 16–26 are coupled to each other by respective communication links 40a–e, which may also use any protocol capable of effectuating such communications such as the TCP/IP protocol. It should be noted that the protocol employed for establishing communications between the mails need not necessarily be the same protocol employed in establishing communications between the gateways and mailers.

The fax-over-email communication system 10 is shown merely to illustrate how, in the prior art, a standard fax message in compliance with the T.30 protocol is sent from the sending fax machine 12 to the receiving fax machine 30, whereby the fax message is communicated through the system by way of an email message having an attached TIFF file. First, a standard fax transmission (fax message) 42 is generated by the sending fax machine 12 and delivered to the standard FAX-to-SMTP gateway 14 by way of communication interface 32. The FAX-to-SMTP gateway 14 converts the standard fax message into a TIFF file and thereafter attaches the TIFF file to an e-mail message 44. The e-mail message 44 is then transferred through the communication link 36 using the TCP/IP protocol. The email message 44 is then relayed from mailer 16 to mailer 26 by way of the other intermediate mailers 18–24 and communication links 40a–e, also using the TCP/IP protocol. Thereafter, the receiving FAX-to-SMTP gateway 28 receives the email message 44 from mailer 26 through communication link 38. The FAX-to-SMTP gateway 28 then detaches the TIFF file from the email message 44 and converts the TIFF file into the fax message 42. The fax message 42 is subsequently delivered to the receiving fax machine 30.

After the receiving fax machine 30 receives the fax message 42, it is typically desired that the receiving FAX-to-SMTP gateway 28 send back a confirmation message to inform the user at the sending fax machine 12 that the fax message 42 was successfully delivered to the receiving fax machine 30. In the prior art, the sending FAX-to-SMTP gateway 14 is configured to send a confirmation request message along with the email message 44 to the receiving FAX-to-SMTP gateway 28 by way of the mailers 16–26. There are two standard confirmation request messages that are typically generated and sent in order to obtain a status as to the delivery of the fax message 42. One is a delivery status notification (DSN) message specified in protocol RFC1891 issued by the Internet Engineering Task Force (IETF), and the other is a message disposition notification (MDN) specified in protocol RFC2298 also issued by the IETF.

The sending FAX-to-SMTP gateway 14 may be configured to send either a DSN confirmation request message, or an MDN confirmation request message, or both. It is desirable to send both the DSN and the MDN messages in order to better ensure the accuracy of the confirmation. In other words, sending both the DSN and the MDN confirmation request messages increases the likelihood that a confirmation response to these messages will be returned back to the sending FAX-to-SMTP gateway 14. The DSN confirmation request is transmitted with the email message 44 as an part of the email message's extension. Each of the mailers 16–26 must have DSN capability so as to propagate the DSN confirmation request to the next mailer. If not, the DSN confirmation request will not propagate to the receiving FAX-to-SMTP gateway 28 while the email message 44 does so propagate.

In one prior art system, only MDNs (and not DSNs) are sent. This poses a problem however, in that the recipient may be configured to ignore the MDN request or it could be unable to understand the MDN request. In fact, users of such prior art systems are finding that some recipients cannot or will not respond to their MDN requests.

The MDN confirmation request is part of the email message's header information, as specified by the RFC822 protocol, and appears to the mailers as a block of data. Additionally, the MDN confirmation request does not require special support or capabilities for intermediate mailers, thus, the recipient, i.e. the FAX-to-SMTP gateway 28, receives the MDN confirmation request as part of the mail message itself. The MDN request is more likely than a DSN to arrive at the recipient because MDNs do not require support of intermediate mailers, whereas, DSNs do require support of intermediate mailers.

A recipient need not be a gateway; another example of a recipient is a Personal Computer (PC) as shown in dashed-lines. It is important to note that in using a PC, the mail software program, which may be one of a variety of commercially-available software programs such as Novell Groupwise, Microsoft Outlook, Netscape mailer, that generally resides in PCs in PCs for reading email applications need not be modified in accordance with the present invention.

There are five possible responses to a DSN confirmation request. First, the sending FAX-to-SMTP gateway 14 may receive a "Relay DSN" response which signifies that one of the mailers 16–28 along the path does not have DSN capability. In this case, the mailer immediately preceding the DSN-incompatible mailer receives the email message 44 and sends back the "Relay DSN" to the sending FAX-to-SMTP gateway 14. This mailer then passes the email message 44 to the DSN-incompatible mailer for transmission to other enroute mailers along the path to the receiving FAX-to-SMTP gateway 28. Second, the sending FAX-to-SMTP gateway 14 may receive a "Delivery Success" response if the DSN confirmation request message reaches the receiving FAX-to-SMTP gateway 28 and the gateway 28 issues the "Delivery Success" response indicating that the fax message 42 was successfully delivered to the receiving fax machine 30. Other types of DSN responses are discussed in a document entitled RFC1894.

Third, the sending FAX-to-SMTP gateway 14 may receive a "Delivery Failure" response which signifies that there was no successful disposition of the fax message 42. This situation would likely be due to an invalid telephone number or an unauthorized telephone connection. Fourth, the sending FAX-to-SMTP gateway 14 may receive a "Delayed Delivery" response which signifies that one of the mailers did not successfully deliver the DSN message within a pre-determined length of time dictated by the mailer generating the "Delayed Delivery" response. The "Delayed Delivery" response is an option that can be requested by a user at the sending end of the system 10. It the user does not request a "Delayed Delivery" response, it will not be generated by an mailer, and thus, not received by the sending FAX-to-SMTP 14.

The fifth type of DSN response, an 'expanded' DSN message, indicates that multiple recipients are going to receive the message, which may cause multiple MDNs to be generated (and sent to the original fax sender). While this (multiple outdials) is undesirable, the sender cannot know how many recipients there are and therefore, the sender cannot reliably know if "all" recipients have received the message.

As previously stated, the MDN confirmation request message is part of the header of the email message (as previously noted, the confirmation request is part of the original message itself while the delivery confirmation message is a separate message). Accordingly, it looks merely as a block of data to an mailer. It follows then that if the email message 44 reaches the receiving FAX-to-SMTP gateway 28, then the MDN confirmation request also reaches the gateway 28. Although, the MDN confirmation request reaches the receiving FAX-to-SMTP gateway 28 under normal conditions, a response to the MDN confirmation request may not be generated, unless the receiving FAX-to-SMTP gateway 28 or the email recipient is configured to send such a message. In other words, generating and sending a response to an MDN confirmation request message is optional, which a user at the receiving FAX-to-SMTP gateway 28 can enable or disable. If such an option is enabled, then a response to the MDN message is sent back to the sending FAX-to-SMTP gateway 14 indicating that the fax message 42 was successfully transmitted to the receiving fax machine 3.

The sending FAX-to-SMTP gateway 14 uses these responses to the DSN and MDN confirmation request messages to inform the user at the sending fax machine 12 of the status of the transmission of the fax message 42. For instance, if the receiving FAX-to-SMTP gateway 14 receives a "Relay DSN" response, the gateway 14 makes an outcall to the sending fax machine 12 notifying it that the DSN confirmation request message was not delivered to the receiving FAX-to-SMTP gateway 28 because one of the mailers is not DSN-compatible. If the sending FAX-to-SMTP gateway 14 receives a "Delivery Success" response, the gateway 14 makes an outcall to the sending facsimile device 12 notifying it that the DSN confirmation request message was delivered by the receiving FAX-to-SMTP gateway 28, and that the fax message 42 was successfully delivered to the receiving facsimile device 30. If the FAX-to-SMTP gateway 14 receives an MDN response, the gateway 14 makes an outcall to the sending facsimile device 12 notifying it that the fax message 42 was successfully delivered to the receiving facsimile device 30.

One drawback of the prior art fax-over-email communication system 10 stems from the fact that the sending FAX-to-SMTP gateway 14 sends two confirmation request messages and makes an outcall to the sending fax machine 12 each time the gateway 14 receives a confirmation request response.

As the reader may recall, it is important that both DSNs and MDNs confirmations are made. Sending solely an MDN request may not be sufficient, at times, because some recipients cannot or will not respond to their MDN requests. Thus, sending both a DSN and MDN request is the only way to ensure that the sender receives indication of successful delivery of its message.

Accordingly, it is often the case that the sending FAX-to-SMTP gateway 14 makes two outcalls to the sending fax machine 12, one for receipt of a response to the DSN confirmation request message and another for the receipt of a response to the MDN confirmation request message. For example, the gateway 14 may receive a DSN response and also an MDN response at different times, causing the gateway 14 to make two outcalls to the sending facsimile device 12. The drawback lies in that some of the sending fax machines 12 may be in a different telephone area code or even in a different country. Thus, each outcall from the gateway 14 to the facsimile device 12 is expensive. It is therefore undesirable to make multiple outcalls from the gateway 14 to the fax machine 12 due to an increase in telephone call charges.

Another drawback of the prior art fax-over-email communication system 10 is that the user at the sending facsimile device 12 may be confused by multiple and different responses received for the same transmitted fax message 42. For example, assume that the sending FAX-to-SMTP gateway 14 sends both DSN and MDN messages to the receiving FAX-to-SMTP gateway 28 by way of the mailers 16–26. If one of the mailers is not DSN compatible, a "Relay DSN" is sent back to the sending FAX-to-SMTP gateway 14. In response to the "Relay DSN", the sending FAX-to-SMTP gateway makes an outcall to the sending fax machine 12 notifying it that the DSN confirmation response was not received. A short time later, the sending FAX-to-SMTP gateway 14 receives an MDN response, and makes another outcall to the sending fax machine 12 informing the user of a successful fax message delivery. The user at the sending facsimile device 12 may get confused due to the discrepancy between the confirmation printed by their own fax machine and the DSN and the MDN responses. In addition, because two confirmations have been generated at the sending fax machine 12 at possibly substantially different times, logistically it becomes a burden to properly place the paper confirmations with the transmitted document. Furthermore, there is additional communications cost to the user for having to make two confirmation calls.

To reiterate, the prior art fax-to-SMTP gateway 14 makes an outcall to the sending facsimile device 12 each time a response to a DSN and MDN confirmation request message is received. In many instances, the prior art fax-to-SMTP gateway 14 receives multiple responses, such as a DSN response and an MDN response. In such a case, the prior art fax-to-SMTP gateway 14 makes two outcalls to the sending facsimile device 12, which may be located in a different telephone area code or in a different country. Such a call is expensive, and making two of them, is doubly so. In addition, in certain situations, the DSN and the MDN responses may indicate a different result, such as when the gateway receives a "Relayed DSN" and an MDN response. In this case, the user at the sending facsimile device 12 may become confused. Finally, the DSN and the MDN responses may be received by the gateway 14 at substantially different times. Thus, two confirmations are generated at the sending facsimile device 12 at substantially different times which can cause logistic problems with duplicate paperwork. As previously noted, both DSN and MDN requests are necessary.

Thus, there is a need for a system, apparatus and method for notifying a user at a sending facsimile device of the delivery status of its outgoing facsimile messages without having the corresponding FAX-to-SMTP gateway 14 make a plurality of outcalls, which leads to undue operating costs, contusion, and logistic problems.

SUMMARY OF THE INVENTION

Briefly, an embodiment of the present invention for use in a communication system for transmission of facsimile (fax) information using an email message from a sending fax device used by a sending fax user to a receiving fax device used by a receiving fax user includes a sending gateway device coupled to the sending fax device for causing transfer of a fax message received from the fax device. The sending gateway device further attaches the transferred fax message to an email message. The at least one of the mailer devices is coupled to a receiving gateway device and is further coupled to the sending gateway device for receiving the email message and transferring the same to the receiving gateway device. The receiving gateway device is coupled to the receiving fax device for detaching the fax information from the transferred email message and coupling the detached fax information, through a receiving communication link, to the receiving fax device for use by the receiving fax user. The sending gateway device receives a particular fax message and prepares an email message having attached thereto the particular fax message and transmits the prepared email message along with a first and a second confirmation requests to the receiving gateway device through the mailer device. The first confirmation request corresponds to a first response and the second confirmation request corresponds to a second response. Upon receipt of a first response to the first confirmation request, the sending gateway device awaits a predetermined length of time for a response to the second confirmation request and upon receipt of a response to the second confirmation request, the sending gateway device places an outcall to the sending fax device. In accordance with the teachings of the present invention, multiple outcalls for confirming the status of the fax message transmission are avoided thereby reducing costs to the sending fax user and further reducing the likelihood of confusion and logistic problems to the sending fax user.

DETAILED DESCRIPTION OF THE PREFERRED EMBODIMENTS

Figure 2:
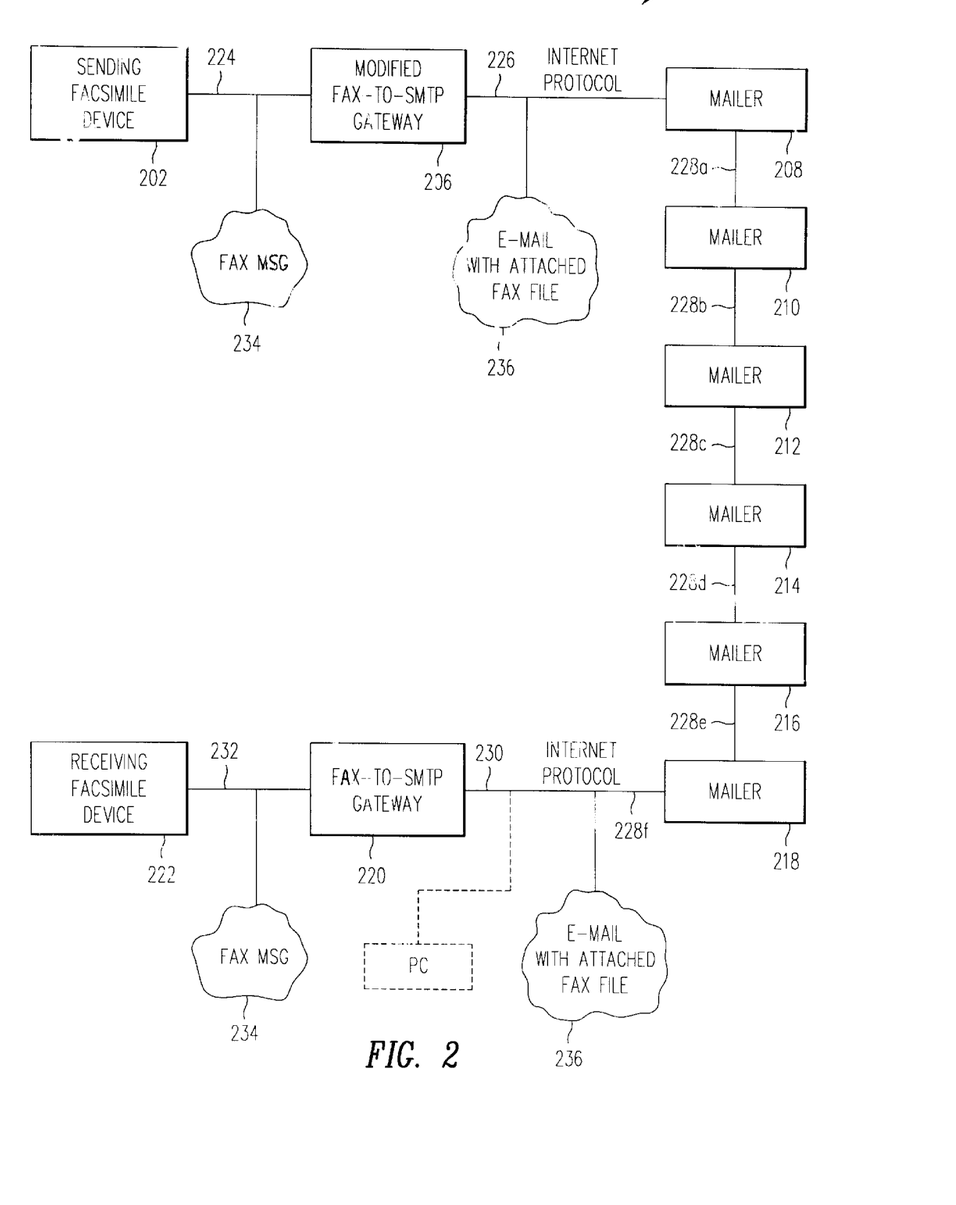
FIG. 2 illustrates a block diagram of an exemplary fax-over-email communication system for transmitting facsimile data as an attachment to an electronic mail (email) in accordance with the invention.

Referring now to FIG. 2, a communication system 200 for transmission of facsimile data using an electronic mail (email) is shown in accordance with an embodiment of the present invention. The communication system 200 is shown to include a sending facsimile device 202, a modified sending fax-over-email gateway 206, and one or more mailers. For example, six (6) mailers, 208–218, are shown in FIG. 2. It is well understood that a different number of mailers may be employed without departing from the scope and spirit of the present invention. The communication system 200 further includes a receiving fax-over-email gateway 220, and a receiving facsimile device 222. The sending and receiving facsimile devices 202 and 222 are coupled to respective fax-over-email gateways 206 and 220 by way of respective communication links 224 and 232. The fax-over-email gateways 206 and 220 are coupled to respective mailers 208 and 218 by way of respective communication interfaces 226 and 230. The mailers 208–218 communicate with each other by way of communication interfaces 228*a–e*. The same communication interface is used between 218 and 220; 206 and 208.

In FIG. 2, the sending facsimile device 202 is any device that can generate a standard fax message, such as a fax message that is in compliance with the T.30 protocol. For example, the sending facsimile device 202 can include a standard fax machine, a mainframe computer, a personal computer, a mail server, a portable personal computer, a network server, or other devices. Alternatively, the sending facsimile device 202 may have the capability of generating a fax message in a format that can be attached to an email. For example, the sending facsimile device 202 can also be a device that can generate a fax message in a tagged image file format (TIFF). If this is the case, the receiving facsimile device 222 may have the capability of converting a standard fax message into a TIFF file, or generating a TIFF file directly.

Currently, both DSNs and MDNs are requested because the recipient could be configured to ignore the MDN request or unable to understand the MDN request. However, the DSN request cannot be ignored and will always generate a reply.

In the preferred embodiment, the modified sending fax-over-email gateway 206 has the capability of attaching a fax message formatted for transmission by email to an email message for transmission through a computer network. For example, the modified sending fax-over-email gateway 206 can have the capability of attaching a TIFF file to an email pursuant to protocol RFC2305 issued by the IETF (in this connection, a document published by the IETF in March of 1999, entitled "Extended Fascimile Using Internet Mail", which explains in more detail the DSN and MDN request protocols, The fax-over-email gateway 206 can also have the capability of converting a standard fax message into a format for transmission by email. For example, the fax-over-email gateway 206 can have the capability of converting a standard fax message in T.30 protocol into a TIFF file for attachment to an email message. The modified fax-over-email gateway 206 also has the capability of generating confirmation request messages for determining the status of the delivery of an outgoing fax message. For example, the fax-over-email gateway 206 is capable of generating a delivery status notification (DSN) confirmation request message or a message disposition notification (MDN) confirmation request message.

The present invention solves the problem exhibited by prior art systems, as previously noted herein, by sending both DSNs and MDNs. The DSN request cannot be ignored and will always generate a reply. Accordingly, sending both a DSN and a MDN request is the only way to ensure the sender gets back some reply indicating that its message was successfully delivered.

The modified fax-over-email gateway 206 has the capability of generating fax messages for delivery to the sending facsimile device 202 in a format compatible for transmission by way of communication link 224. The communication interface 224 can be either a public switch telephone network (PSTN) or a computer network link. An example of a fax-over-email gateway 206 is the AS5300 Access Server product manufactured by Cisco Systems, Inc. of San Jose, Calif., the assignee of the subject patent application. However, the fax-over-email gateway 206 is modified in accordance with the invention, as will be subsequently explained in more detail. Although the modified fax-over-email gateway 206 has been described as to its capability for transmitting a fax-over-email, it shall be understood that it also has the capability of receiving fax-over-email from a computer network for communication with the sending facsimile device 202.

The receiving facsimile device 222 can be any device that can receive and interpret a standard fax message, such as in accordance with the T.30 protocol. For example, the receiving facsimile device 222 can include a standard fax machine, a mainframe computer, a personal computer, a mail server, a portable personal computer, a network server, or other devices. Alternatively, the receiving facsimile device 222 may have the capability of receiving a fax message in a format that can be attached to an email, such as in a TIFF format. If this is the case, the receiving facsimile device 222 may have the capability of converting a TIFF file into a standard fax message T.30 protocol.

The receiving fax-over-email gateway 220 has the capability of receiving an email message having a fax message attached thereto, and detaching the fax message therefrom. For example, the receiving fax-over-email gateway 220 has the capability of receiving an email message with a TIFF file attached thereto in accordance with the RFC2305 protocol, and detaching the TIFF file from the email message. The receiving fax-over-email gateway 220 can also have the capability of converting a fax message formatted for transmission by email to a standard fax message or displaying on a user's screen. For example, the receiving fax-over-email gateway 220 can have the capability of converting a TIFF file into a fax message in T.30 format. The receiving fax-over-email gateway 220 can also have the capability of generating responses to confirmation request messages and transmitting the responses back to the sending fax-over-email gateway 206. For example, the fax-over-email gateway 220 can generate and transmit a DSN response or an MDN response back to the sending fax-over-email gateway 206.

Also, the receiving fax-over-email gateway 220 has the capability of sending an incoming fax message to the receiving facsimile device 222 in a format compatible for transmission by way of the communication interface 232. The communication interface 232 can be a PSTN link or a computer network link. An example of a fax-over-email gateway 220 is the AS5300 product. Although the receiving fax-over-email gateway 220 has been described as to its receiving of a fax-over-email capability, it shall be understood that it can also have the capability of generating and transmitting a fax-over-email to a computer network. The receiving fax-over-email gateway 220 may be but need not be modified as the sending fax-over-email gateway 206 in accordance with the invention.

In FIG. 2, the sending (or modified) fax-over-email gateway 206 communicates with the receiving fax-over-email gateway 220 by way of communication links 226 and 230, and at least one mailer such as mailers 208–218 having communication links 228a–e, which may be a TCP/IP interconnection, coupled to each other. The communication links 226, 228 and 230 can communicate information using the Transmission Control Protocol/Internet Protocol (TCP/IP). The mailers, also known as Mail Transfer Agents (mailers) or Simple Mail Transfer Protocol (SMTP) servers, are known in the relevant art for routing email to and from different computer networks. Examples of such known mailers in the relevant art include Sendmail, Exchange, PMDF and qmail.

In operation, a fax message 234 is generated by the sending facsimile device 202 and transmitted to the modified fax-over-email gateway 206 by way of the communication link 224. If the fax message 234 is transmitted over the communication link 224 in a standard fax format, such as in a T.30 format, the fax-over-email gateway 206 converts the fax message into a format that is capable of being transmitted by email, such as in a TIFF format. If the fax message 224 that is transmitted over the communication link 224 is in a TIFF format or a format capable of being sent by email, then the fax-over-email gateway 206 need not make the conversion. In both cases, the fax-over-email gateway 206 prepares an email message 236 having an attached fax file (e.g. TIFF file) preferably in accordance with standard protocol RFC2305.

Thereafter, the email message 236 is transmitted to the receiving fax-over-email gateway 220 by way of the communication link 226 with at least one mailer, such as mailers 208–218 including communication links 228a–e, connecting each of the mailers and the communication link 230. The email message 236 is transmitted through the mailers 208–218 and communication links 226, 228 and 230 using, the TCP/IP protocol. The email message 236 is subsequently received by the receiving fax-over-email gateway 220 where its TIFF file is detached from the email message 236. The receiving fax-over-email gateway 220 may transmit the TIFF file directly to the receiving, facsimile device 222 by way of communication link 232 if the facsimile device 222 and communication link 232 are capable of receiving and transmitting a TIFF file format, respectively. Otherwise, the receiving fax-over-email gateway 220 converts the TIFF file into the standard fax format prescribed by the T.30 protocol prior to transmission thereof to the receiving facsimile device 222 by way of communication link 232.

In order for a user at the sending facsimile device 202 to obtain status of the transmission of its fax message 234, the sending fax-over-email gateway 206 is configured to request confirmation request messages with the email message 236. For example, the gateway 206 can be configured to include DSN and MDN confirmation requests with the email message 236. As previously discussed, two confirmation request messages are customarily sent in order to increase the chances of reliably obtaining a response that informs the user of the status of the delivery of the fax message 234. As previously described, a DSN confirmation request message can generate four types of responses. These are the "Relay DSN", the "Delivery Success", the "Delivery Failure", and the "Delayed Delivery", one of which is the type used for a MDN confirmation request message, as previously discussed herein.

The modified sending fax-over-email gateway 206 does not generally make an outcall to the sending facsimile device 202 each time it receives a response to the DSN and MDN confirmation request. Instead, when the modified sending fax-over-email gateway 206 receives a DSN response, it waits for a predetermined length of time before making an outcall to the sending facsimile device 222. This is done in hopes of receiving the MDN response within that time. If the modified sending fax-over-email gateway 206 receives an MDN response within the predetermined waiting period, then it makes an outcall to the sending facsimile device 202 for generating thereat a confirmation that the fax message was successfully delivered. In such a case, the modified sending fax-over-email gateway 206 made only a single outcall to the sending facsimile device 202, even though it received both the DSN and MDN responses. Because only a single outcall is made by the modified sending fax-over-email gateway 206, a substantial cost reduction is achieved in terms of telephone call charges, in addition to reducing the likelihood of confusion and logistic problems for a user at the sending facsimile device 202.

Consider the following exemplary scenario. In this scenario, assuming that the fax message 234, sent to the receiving facsimile device 222, was delievered successfully, the modified sending fax-over-email gateway 206 sends both DSN and MDN confirmation request messages with the fax-over-email message 236 message. In this example, all of the en-route mailers (such as mailers 208–218) are DSN capable. In such a case, the modified sending fax-over-email gateway 206 first receives a "Delivery Success" response from the receiving fax-over-email gateway 220. This causes the modified sending fax-over-email gateway 206 to wait for a predetermined length of time before it makes an outcall to the sending facsimile device 202, such as, for example, 20 minutes. If the MDN response arrives at the modified sending fax-over-email gateway 206 within the predetermined time period (e.g. 20 minutes), then gateway 206 makes one outcall to the sending facsimile device 202. Thus, in this situation, the modified sending fax-over-email gateway 206 avoids making multiple outcalls.

Consider the following additional exemplary scenario. In this scenario, still assuming that the fax message 234 sent to the receiving facsimile device 222 was successful, the modified sending fax-over-email gateway 206 sends both a DSN and an MDN confirmation request message with the email message 236. In this example, one of the en-route mailers (such as one of the mailers 208–218) is not DSN capable, such as the qmail mailer. In such a case, the modified sending fax-over-email gateway 206 receives a "Relay DSN" response from an enroute mailer preceding the DSN incapable mailer. This causes the modified sending fax-over-email gateway 206 to wait for a predetermined length of time before it makes an outcall to the sending facsimile device 202, such as for example, 20 minutes. If the MDN arrives at the gateway 206 within the predetermined time period (e.g. 20 minutes), then gateway 206 makes an outcall to the sending facsimile device 202. Thus, in this situation, the modified sending fax-over-email gateway 206 also avoids making two outcalls.

In the preferred embodiment, the predetermined length of time for the modified sending fax-over-email gateway 206 to wait before it makes the outcall to the sending facsimile device 202 should correlate with a reasonable expected time in which the MDN response is to arrive at the gateway 206. In the preferred embodiment, the predetermined wait period is about 10 to 20 minutes. The wait period need not be fixed, but can depend on factors such as the location of the receiving facsimile device with respect to the sending facsimile device, how many intermediate mailers, or other factors.

In an alternative embodiment, the sending facsimile device 202 may transmit a fax message to multiple receiving facsimile devices rather than to solely one receiving device, such as 222. In Such a case, for each fax transmission, a mail message having attached thereto the fax message, is transmitted and a DSN response is returned to the sending facsimile device 202. Accordingly, for each fax transmission, a separate timer is started awaiting MDN response.

Figure 3:
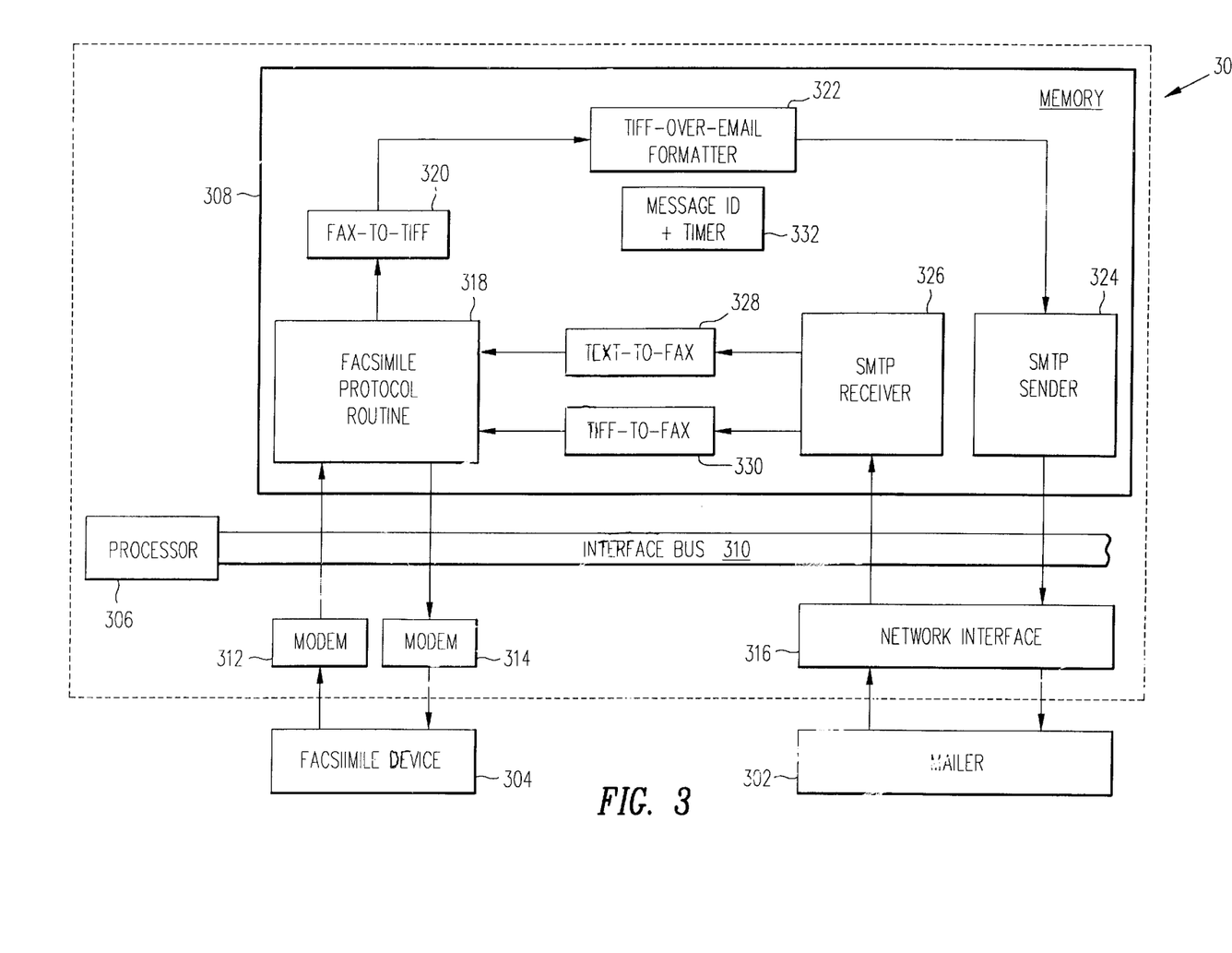
FIG. 3 illustrates a block diagram of an exemplary fax-over-email gateway in accordance with the invention.

FIG. 3 illustrated, a block diagram of an exemplary fax-over-email gateway 300 in accordance with the present invention. The fax-over-email gateway 300 is shown in FIG. 3 to be coupled to a mailer 302 and a facsimile device 304. It shall be understood that the fax-over-email gateway 300 may communicate with multiple facsimile devices, only one of which is shown here for simplicity. The fax-over-email gateway 300 comprises a processor 306, a memory 308, an interface bus 310, at least one modem, such as modems 312 and modem 314, and a network interface 316. Preferably, a large part of the operation of the fax-over-email gateway 300 involves software routines whose code reside in the memory 308. In one embodiment of the present invention, the software routines include a facsimile protocol routine 318, a fax-to-TIFF converter 320, a TIFF-over-email formatter 322, an SMTP sender 324, an SMTP receiver 326, a text-to-fax converter 328, a TIFF-to-fax converter 330, and a memory location (queue) 332 for the message-id and the timer.

The facsimile device 304 is coupled to the fax-over-email gateway 300 by way of at least one modem but may communicate with the gateway 300 through multiple modems, such as modems 312 and 314. Typically, the fax-over-email gateway 300 includes many modems for communicating with a plurality of facsimile devices (not shown). While modems 312 and 314 are used for providing the gateway 300 with a communication interface with the facsimile device 304, it shall be understood that there are alternative interfaces for communicating with such a device. For example, a network interface can be employed in place of or in addition to modems for establishing a communication link between the facsimile device 304 and the gateway 300. The modems 312 and 314 are functionally coupled to the facsimile protocol routine 318 residing as software in the memory 308, and to the processor 306 and the interface bus 310. The output of the facsimile protocol routine 318 is coupled to the fax-to-TIFF converter 320 for conversion of the fax message from the T.30 format to the TIFF format.

The fax-to-TIFF converter 320 is coupled to the TIFF-over-email formatter 322 which can receive a TIFF file and generate an email with an attached TIFF file for transmission over a computer network. The TIFF-over-Email formatter prepares the email message including the attached TIFF file with the DSN and MDN confirmation request messages. The output of the TIFF-over-email formatter 322 is coupled to the SMTP sender 324 for transmission of the email message to the mailer 302. The SMTP sender 324 is functionally coupled to the network interface 316 which is, in turn, coupled to the Mailer 302. In the preferred embodiment, the network interface 316 is an Ethernet network interface.

The network interface 316 is coupled to the SMTP receiver routine 326 residing in the memory 308. However, the routine is operated in a receive mode and a transmit mode. The SMTP receiver 326 is coupled to the Text-to-fax routing 328 and the TIFF-to-fax routine 330. The Text-to-fax routine 328 and the TIFF-to-fax routine 330 are, in turn, coupled to the facsimile protocol routine 318.

The preparation of the fax-over-email is pursuant with the requirements of various protocols. These protocols include RFC821 "Simple Mail Transfer Protocol (SMTP)", RFC822 "Standard for the format of ARPA Internet Text Messages", RFC1891 "SMTP Service Extension for Delivery Status Notifications (DSN)", RFC1892 "The Multipart/Report Content Type for the Reporting of Mail System Administrative Messages", RFC1894 "An Enhanced Mail System Status Codes", RFC1894 "An Extensible Message Format for Delivery Status", RFC2298 "An Extensible Message Format for Delivery Status", RFC2045 "Multipurpose Internet Mail Extensions (MIME) Part One: Format of Internet Message Bodies", RFC2046 Multipurpose Internet Mail Extensions (MIME) Part Two: Media Types", RFC2301 "File Format for Internet Fax", RFC2305 "A Simple Mode of Facsimile Using Internet Mail" and RFC2532.

In operation, a facsimile message is generated at the facsimile device 304 and communicated over to the fax-over-email gateway 300 using modem 312. The fax message is then operated on by the facsimile protocol routine under the control of the processor 306. The facsimile protocol routine 318 controls the modem 312 for communicating with the facsimile device 304 per the T.30 protocol. Once the fax message is received, it is sent to the FAX-to-TIFF conversion routine 320 for converting the fax message from T.30 format into a TIFF file. The TIFF file is then sent to the TIFF-over-email formatter 322 to produce an email having the TIFF file attached thereto in accordance with the specified protocols, such as RFC2305. If requested, the DSN and the MDN confirmation request messages are included in the email message pursuant to protocols RFC1891 and RFC2298, respectively. According to the standard, as defined in RFC822, the email message is assigned a message-id and stored in an memory location (queue) 332. The email message is then sent to the network SMTP sender for formatting the email message in accordance with the desired protocols RFC821 and RFC822. Thereafter, the email message is sent to the network interface 316 for transmission to the mailer 302 and subsequently to its final destination.

When a response to the DSN confirmation request message is received by the fax-over-email gateway 302 from the mailer 302, it is initially operated on by the SMTP receiver routine 326 by way of the network interface 316. The SMTP receiver routine 326 includes the necessary software to implement the predetermined waiting period in accordance with the invention. In particular, when the DSN response is either a "Relay DSN" or a "Success Delivery" DSN, the SMTP receiver routine 326 stores the DSN response in a queue memory 332 with its corresponding message id and with a timer parameter to begin the predetermined waiting period for the MDN response. If the MDN response is received by the SMTP receiver before the predetermined waiting period has expired, then the SMTP receiver 326 removes the DSN message and message-id from the queue 332 and cancels the timer, then transmits the MDN message to the Text-to-fax converter 328 for transmitting the message to the facsimile device 304 through the facsimile protocol routine 318 and modem 314. If the MDN response is not received within the predetermined waiting period, then the DSN message stored in queue 332 is sent to the Text-to-fax converter routine 328 for transmitting the message to the facsimile device 304 through the facsimile protocol routine 318 and modem 314.

Figure 4:
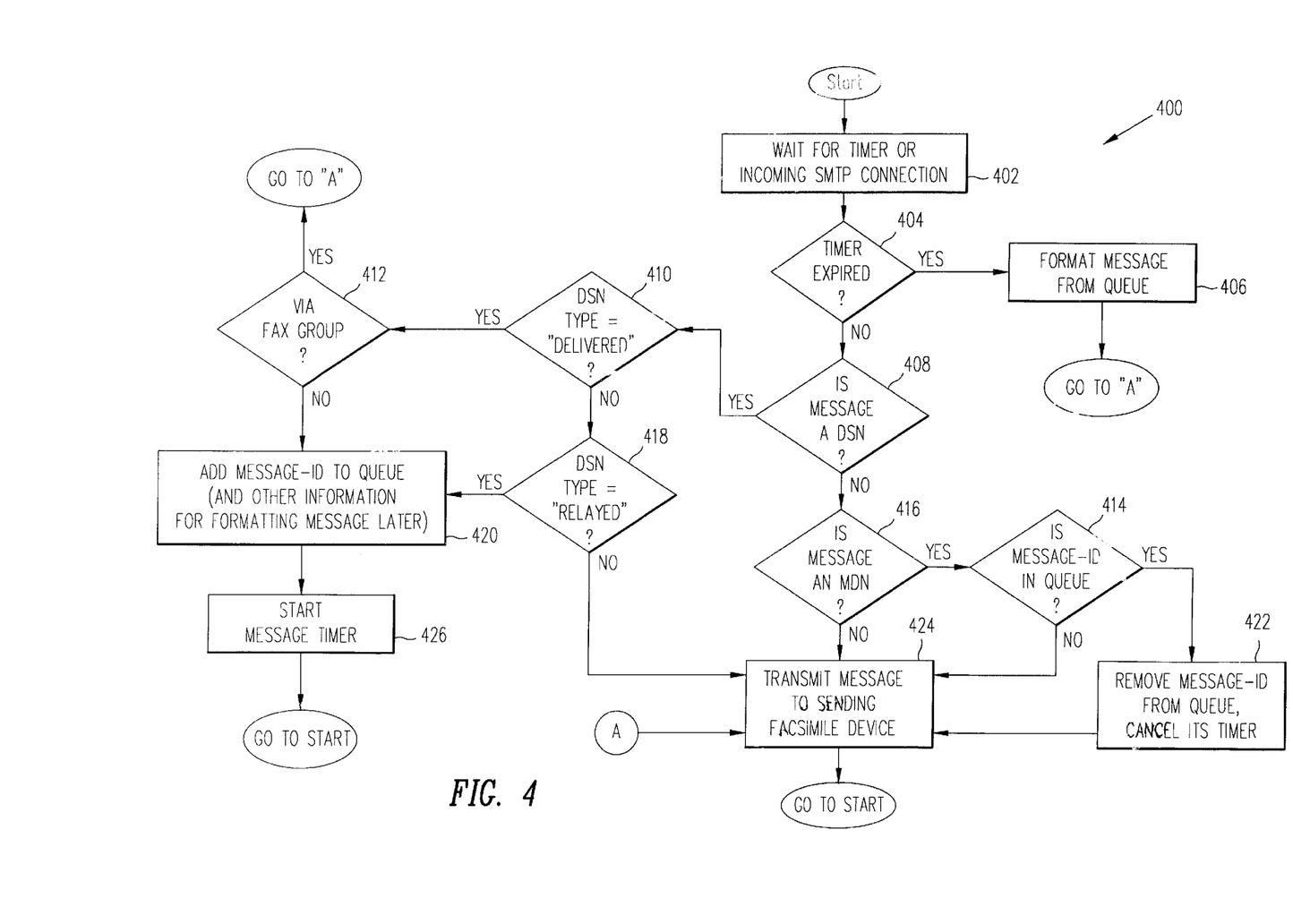
FIG. 4 illustrates a flow chart of an exemplary software performed by the fax-to-email gateway in accordance with the invention.

FIG. 4 illustrates a flow chart of an exemplary subroutine 400 of the SMTP receiver routine 326 for processing the DSN and the MDN responses in accordance with the invention. As earlier noted in the Background of the Invention Section of this document, sending the original sender the 'expanded' DSN is the best course of action. This course of action is the example depicted in the flowchart of FIG. 4. The subroutine 400 begins, at 402, waiting for either the timer message or an incoming SMTP connection. When a timer message has been received or an incoming SMTP connection is made, a determination is made at 404 as to whether the timer has expired. If the timer has expired, the message from the queue is formatted at 406 and then, at 424, the message is transmitted to the facsimile device 304. This happens when a DSN response has been received and placed in the queue, but no MDN response has been received within the predetermined waiting period.

If the timer has not expired, a determination is made as to whether the message received is a DSN message at 408. If it is, a further determination is made as to whether the message is a "Delivery Success" response at 410. If the received message is a "Delivery Success" response, then, at 412, yet another determination is made as to whether the message was sent via a fax group (multiple fax recipients). If it is, then the "Delivery Success" message is transmitted to the facsimile device 304. If it is determined that the message is not sent via a fax group, then at 420, the message-id is added to the queue along with other information for later formatting of the message. Next, at 426, the message timer is started and the process continues to 402 and 404 awaiting an additional message while monitoring the timer. This happens when a "Delivery Success" DSN message is received, and the gateway 300 (shown in FIG. 3) is waiting for a subsequent MDN message to prevent making two outcalls to the facsimile device 304.

Referring to FIG. 4, if the DSN message is not a "Delivery Success" as determined at 410, a determination is made as to whether the DSN message is a "Relay DSN" at 418. If it is, at 420, the message is added to the queue including its message-id and other formatting information in block 420. The message timer is started at 426 and the process branches to 402 and 404 awaiting an additional message while monitoring the timer. This happens when a "Relay DSN" response is received and the gateway 300 (in FIG. 3) is waiting for a subsequent MDN message, to prevent making two outcalls to the facsimile device 304. If the DSN message is not a "Relay DSN" as determined at 418, the message is transmitted to the sending facsimile device 304 (in FIG. 3) at 424. This happens when a "Delay DSN" response or a "Delivery Failure" DSN response is received. In both cases, the user probably wishes to know, as soon as possible, if the fax message failed to be successfully delivered or the user may have requested a "Delay DSN" response and therefore wants to know of such condition immediately.

If at 408, it is determined that the received message is not of a DSN type, then at 416, it is determined whether the message received is an MDN. If it is, at 414, a determination is made as to whether the message-id is in the queue 332 (in FIG. 3). If the message-id is in the queue 332, then the message-id is removed from the queue and the timer is cancelled at 422. Next, the message is transmitted to the facsimile device 304 (in FIG. 3) at 424. This happens when a DSN message has been already received and it is in the queue 332 with its message-id, and the MDN message has been received within the predetermined waiting period. Thus, that which is desired is to remove the DSN message-id from the queue 332 and cancel its timer (at 422), then transmit the received MDN message to the facsimile device 304 (at 424). If the DSN message-id is not in the queue 332 as determined at 414, the MDN message is transmitted to the facsimile device 304 at 424. This happens when the MDN message is received by the gateway 300 after the predetermined waiting period has expired or the DSN has not been received.

It should be noted that while in the preferred embodiment of the present invention the MDN contains more information rendering it more useful for use in receiving a confirmation message. Alternatively, the DSN may be used such that the sending gateway device awaits a DSN response.

If the received message is not of a MDN type as determined at 416, then the subroutine 400 transmits the message to the sending facsimile device 304 at 424. This happens when the received message is neither a DSN message nor an MDN message. In which case, it is not desired that the subroutine 400 act on it, other than transmitting it to the sending facsimile device 304.

Although the present invention has been described in terms of specific embodiments, it is anticipated that alterations and modifications thereof will no doubt become apparent to those skilled in the art. It is therefore intended that the following claims be interpreted as covering all such alterations and modifications as falls within the true spirit and scope of the invention.

It is claimed:

1. A fax communication system for use in communicating an email message having attached thereto a facsimile (fax) message between a sending fax device used by a sending fax user and a receiving fax device used by a receiving fax user, the fax message being prepared by the sending fax device for transmission thereof as an attachment to the email message to the receiving fax device through at least one mailer device, the mailer device for coupling the email message, through a receiving gateway device, to the receiving fax device comprising:

a sending gateway device responsive to a particular fax message and operative to prepare an email message having attached thereto the particular fax message for transmission of the prepared email message, through the at least one mailer device, to the receiving gateway device, the sending gateway device further operative to prepare a first and a second confirmation requests, the first confirmation request corresponding to a first response and the second confirmation request corresponding to a second response, the sending gateway device further operative to transmit the prepared email message including the first and second confirmation requests to the receiving gateway device, upon receipt of the first response to the first confirmation request, the sending gateway device operative to wait a predetermined length of time for a response to the second confirmation request and upon receipt of the response to the second confirmation request within the predetermined length of time, the sending gateway device operative to place only a single outcall to the sending fax device, wherein multiple outcalls for confirming the status of the fax message transmission is avoided thereby reducing costs to the sending fax user and further reducing the likelihood of confusion and logistic problems to the sending fax user.

2. A fax communication system as recited in claim 1 wherein the sending gateway device is further coupled to the sending fax device through a public switch telephone network (PSTN).

3. A fax communication system as recited in claim 1 wherein the sending gateway device is further coupled to the sending fax device through a computer network link.

4. A fax communication system as recited in claim 1 wherein the fax message is in the form of TIFF.

5. A fax communication system as recited in claim 1 wherein the first confirmation request is a Delivery Status Notification (DSN) and the second confirmation request is a Message Disposition Notification (MDN).

6. A fax communication system as recited in claim 1 wherein the sending gateway device is a modified access server.

7. A fax communication system as recited in claim 1 wherein the first response is a "Delivery Success" response.

8. A fax communication system as recited in claim 1 wherein the first response is a "Relay DSN" response.

9. A fax communication system as recited in claim 8 wherein the first response is transmitted by the at least one of the mailers for indicating that the mailer device being used to transmit the first response is incapable of processing the first confirmation request.

10. A fax communication system as recited in claim 1 wherein the sending gateway device includes a timer device for use in waiting the predetermined length of time for a response to the second confirmation request.

11. A fax communication system as recited in claim 1 wherein the sending gateway device is operative to transmit multiple email messages to multiple receiving fax devices, each email message having attached thereto a fax message, the sending gateway device including a timer for each of the fax messages and starting each of the timers for waiting the predetermined length of time, corresponding to each of the fax messages, for a response to the second confirmation request.

12. A communication system for transmission of facsimile (fax) information using an email message from a sending fax device used by a sending fax user to a receiving fax device used by a receiving fax user through at least one mailer device comprising:
- a sending gateway device coupled to the sending fax device for causing transfer of a fax message received from the fax device and attaching the same to an email message, at least one mailer devices being coupled to a receiving gateway device and further coupled to the sending gateway device of receiving the email message and transferring the same to the receiving gateway device, the receiving gateway device being coupled to the receiving fax device and for detaching the fax information from the transferred email message and coupling the detached fax information, through a receiving communication link, to the receiving fax device for use by the receiving fax user, the sending gateway device responsive to a particular fax message and operative to prepare an email message having attached thereto the particular fax message and further operative to transmit the prepared email message including a first and a second confirmation requests for receipt by the receiving gateway device through the at least one of the mailers, the first confirmation request corresponding to a first response and the second confirmation request corresponding to a second response, upon receipt of a first response to the first confirmation request, the sending gateway device operative to await a predetermined length of time for a response to the second confirmation request and upon receipt of a response to the second confirmation request within the predetermined length of time, the sending gateway device operative to place only a single outcall to the sending fax device,
- wherein multiple outcalls for confirming the status of the fax message transmission is avoided thereby reducing costs to the sending fax user and further reducing the likelihood of confusion and logistic problems to the sending fax user.

13. A communication method for transmission of facsimile (fax) information and requesting confirmation of the transmission using an email message to send the fax information, upon request by a sending fax user, between a sending fax device and a receiving fax device, the email message being transferred through at least one mailer device coupled to a receiving gateway device, the receiving gateway device being coupled to the receiving fax device, the receiving gateway for detaching the fax information from the email message and coupling the same through a receiving communication link to the receiving fax device for use by a receiving fax user of the receiving fax device, the method comprising:
- receiving a fax message;
- preparing an email message having attached thereto the received fax message;
- transmitting the prepared email message including a first and a second confirmation requests for receipt by the receiving gateway device through the at least one of the mailers, wherein upon receipt of the transmitted email message, the fax message is detached of transmission to the receiving fax device, the first confirmation request corresponding to a first response and the second confirmation request corresponding to a second response;
- upon receipt of a first response to the first confirmation request, awaiting a predetermined length of time for a response to the second confirmation request; and
- upon receipt of a response to the second confirmation request within the predetermined length of time, placing only a single outcall to the sending fax device.

14. A communication method as recited in claim 13 further including indicating successful delivery of the fax message by the first response.

15. A communication method as recited in claim 13 wherein the first response is a "Delivery Success" response.

16. A communication method as recited in claim 13 wherein the first response is a "Relay DSN" response.

17. A communication method as recited in claim 13 wherein the predetermined length of time is a function of the location of the receiving fax device with respect to the sending fax device.

\* \* \* \* \*